US008174524B1

United States Patent
Laur

(10) Patent No.: US 8,174,524 B1
(45) Date of Patent: May 8, 2012

(54) RAY HIT COALESCING IN A COMPUTER RENDERING PROGRAM

(75) Inventor: David Laur, Seattle, WA (US)

(73) Assignee: Pixar, Emeryville, CA (US)

( * ) Notice: Subject to any disclaimer, the term of this patent is extended or adjusted under 35 U.S.C. 154(b) by 124 days.

(21) Appl. No.: 12/712,104

(22) Filed: Feb. 24, 2010

Related U.S. Application Data

(63) Continuation of application No. 12/062,420, filed on Apr. 3, 2008, now abandoned.

(60) Provisional application No. 60/939,804, filed on May 23, 2007.

(51) Int. Cl.
*G06T 15/00* (2011.01)

(52) U.S. Cl. .................................................. 345/419

(58) Field of Classification Search .................. None
See application file for complete search history.

(56) References Cited

U.S. PATENT DOCUMENTS
2009/0284523 A1 * 11/2009 Peterson et al. ............... 345/419

OTHER PUBLICATIONS
Laur et al.; "Ray Tracing for the Movie 'Cars'"; IEEE Symposium on Interactive Ray Tracing; Sep. 2006.*
Yagel et al.; Priority-driven Ray Tracing; The Journal of Visualization and Computer Animation, vol. 8: pp. 17-32; Wiley & Sons; 1997.*

* cited by examiner

*Primary Examiner* — Kee M Tung
*Assistant Examiner* — Carlos Perromat
(74) *Attorney, Agent, or Firm* — Kilpatrick Townsend & Stockton LLP

(57) ABSTRACT

Ray trees are evaluated to render an image in a computer graphic program with a shaded object by launching rays from an object to be shaded in a scene. The rays intersect other objects in the scene at hit points. The hit points that can be shaded by the same shader program are assigned to the same computational group referred to as a shading grid. The hit points in the same shading grid are evaluated by operators in the shader program as a group. The image may then be rendered using the evaluated hit points.

22 Claims, 3 Drawing Sheets

RAY HIT COALESCING IN A COMPUTER RENDERING PROGRAM

CROSS REFERENCE TO RELATED APPLICATIONS

This continuation application claims priority under 35 U.S.C. §120 to U.S. Non-provisional application Ser. No. 12/062,420, filed on Apr. 3, 2008 which claims priority under 35 U.S.C. §119(e) to U.S. Provisional Application No. 60/939,804 filed on May 23, 2007, all of which is incorporated by reference herein.

TECHNICAL FIELD

The present invention relates to ray tracing in a shader program for computer graphics and, more particularly, to evaluating ray tracing hit points in groups that can each be shaded together to improve the performance of a rendering program.

BACKGROUND

In computer graphics, a rendering program renders an image by producing pixels from a scene description. Scene description input files contain a three dimensional geometric description of all objects in the scene, as well as a virtual-camera description and light descriptions. A shader program may be associated with each object in the scene and tagged to each light to compute shading values for the object. Shading values may be related to properties such as color, shadow, smoke, reflections, texture, and the like.

While rendering an image, the rendering program reads the geometric description of an object and divides the object into smaller subobjects. Object division occurs along parametric lines in a natural, local coordinate system on the object. Object division continues until each individual subobject is essentially "flat" or otherwise small enough to be accurately shaded.

Once a subobject is ready for shading, a series of shading points are defined on the subobject. The data representing each shading point consists of a set of properties. Example properties include the position (P) of the point in space at coordinates (x, y, z), the surface normal (N) at P, and the nominal color ($C_S$) of P. The shader program operates on these values and produces output values at each shading point. The rendering program collects the outputs on all shading points and then samples them, interpolating as necessary, to populate pixels for an output frame buffer.

A shader compiler converts the text of the shader program to an executable form. A shader interpreter reads the executable form and evaluates the instructions on a particular set of shading point values. The shading points from a particular subobject are referred to as a shading grid. The shading grid represents several arrays of input values for shader instructions. For example, N values can be collected from all shading points and an operation can be performed on all of the N values at the same time. Thus, shader operators can function in an single instruction, multiple data (SIMD) fashion before the interpreter evaluates the next operator.

In some embodiments of a shading system, there may be several available ray tracing functions which may be implemented directly as individual operators or as expressions of several operators. Examples may include trace( ), gather( ), environment( ), indirectdiffuse( ), occlusion( ), transmission( ), and shadow( ). For example, trace( ) may be used in an expression as follows:

RayOutputColor=trace(P,direction)

When executing a trace( ) call, the renderer launches a ray from the shading point P in the specified direction. The parameters P and direction may also represent a list of origins or directions; in which case a single call to trace( ) may launch many rays, returning a list of results, or in some cases an averaged result. For each ray that intersects an object in the scene, a color value at a ray hit point (h) on the object is determined by executing a shader program associated with the hit object using h as the new shading point. The shader output value at the ray hit point is then returned to the shader program that launched the ray. For example, when a mirror (or some other type of reflective surface) is included in a scene, multiple rays are launched from the surface of the mirror. Whenever a ray intersects an object, a color value at the object hit point is returned to the surface of the mirror. The mirror surface is then colored with the color values returned from the rays such that a scene reflection is shown in the mirror. Sometimes, the shader program at the ray hit point may also call trace ( ), for example if that object is also reflective. Such nested ray tracing calls form what is referred to as a ray tree.

Ray trees are conventionally evaluated by tracing a first ray from a first launch point to a ray hit point on an object. A second ray is then traced from the ray hit point and the values returned by the second ray are used to compute the color value at the ray hit point. Given the color at the ray hit point, the first ray can return a value to the computation of the color value at the first launch point. The ray tree is evaluated in a depth first manner such that each ray is evaluated one at a time, one hit at a time. In other words, the shader program is evaluated at each hit point for each ray at the time of the hit on that point only. This method of evaluating shading along ray trees repeats many computational and data access operations which might be shared when many ray hits share the same shader program, thereby slowing the rendering process. Furthermore, when shading at the hit points involves further ray tracing, the method of shading one hit point at a time cannot take advantage of possible computational coherency that might arise out of tracing those additional rays as a group.

Therefore, what is needed is a method for evaluating ray trees that improves the performance of a ray tracing system.

SUMMARY

In accordance with one aspect of the invention, the present invention is directed to a method for evaluating a ray tree in a ray tracing system for computer graphics. A plurality of first rays are received. First objects of a scene are received. First ray hit points are identified at locations where a subset of the first rays intersects the first objects. The first ray hit points that can be shaded together are assigned to a first group. First values are determined at the first ray hit point locations assigned to the first group using a first shader program. An image is rendered in response to the first values.

In some embodiments of the invention, a plurality of second rays are received. Second objects of a scene are received. Second ray hit points are identified at locations where a subset of the second rays intersects the second objects. The second ray hit points that can be shaded together are assigned to a second group. Second values are determined at the second ray hit point locations assigned to the second group using a second shader program. The image is rendered in response to the second values.

In accordance with another aspect of the invention, the present invention is directed to a computer program product having a computer readable medium storing a set of code modules which when executed by a processor of a computer system cause the processor to evaluate a ray tree in a ray tracing system for computer graphics. The computer program includes code for receiving a plurality of first rays; code for receiving first objects of a scene; code for identifying first ray hit points at locations where a subset of the first rays intersects the first objects; code for assigning to a first group the first ray hit points that can be shaded together; and code for determining first values at the first ray hit point locations assigned to the first group using a first shader program.

These and other advantages of the invention will be apparent to those of ordinary skill in the art by reference to the following detailed description and the accompanying drawings.

DETAILED DESCRIPTION

A method for evaluating ray trees in accordance with embodiments of the present invention improves the performance of a ray tracing system by launching rays from an object to be shaded in a scene that is to be rendered in a computer graphics program. The rays intersect other objects in the scene at hit points. The hit points that can be shaded by the same shader program are assigned to the same computational group referred to as a shading grid. Each operator in the shader program is then applied to the hit points in the same shading grid to evaluate the hit points as a group, rather than executing the entire shading program at each shading hit point individually. Ray tracing performance is improved by reducing shading set-up costs and computations involving input values which are constant across all hit points, incurring them once per group rather than once per point, and by creating opportunities for shading programs to leverage parallel computation (e.g., SIMD). Ray tracing performance is further improved when the shading program executing on the group of hit points traces additional (secondary, tertiary, etc) rays from those hit points. Efficiencies inherent in the coherency of the ray data representation, and sometimes also in the geometric properties of the rays, can be exploited to improve computational efficiency.

A shader program is executed by a computing device such as the computing device described with reference to FIG. 3. The shader program operates on a group of shading points forming a computational array whose values depend upon the particular shading points being evaluated. The size of the array is determined by a renderer. The renderer attempts to maximize the size of the array because computational expediency results when a single action is performed on a group of data.

An interpreter is an execution engine included in the renderer to execute operators in a compiled program on an array of shading points. The interpreter identifies the operators to execute and binds the code for the implementation of the operators. The interpreter identifies input values for the operator (such as P and N) and any other values that may be included in the shading grid. The interpreter then executes the implementation of each operator. Because the interpreter binds and executes the operators on a group of shading points together, the array of shading points is expeditiously evaluated compared to the conventional evaluation of a single shading point. By increasing the number of shading points in an array that can be evaluated together, computational performance is improved. In accordance with embodiments of the invention, as one having ordinary skill in the art would appreciate, operators may be executed on a group of shading points together by methods other than an interpreter (e.g., standard compiled programs, hardware implementations, etc.).

Figure 1:
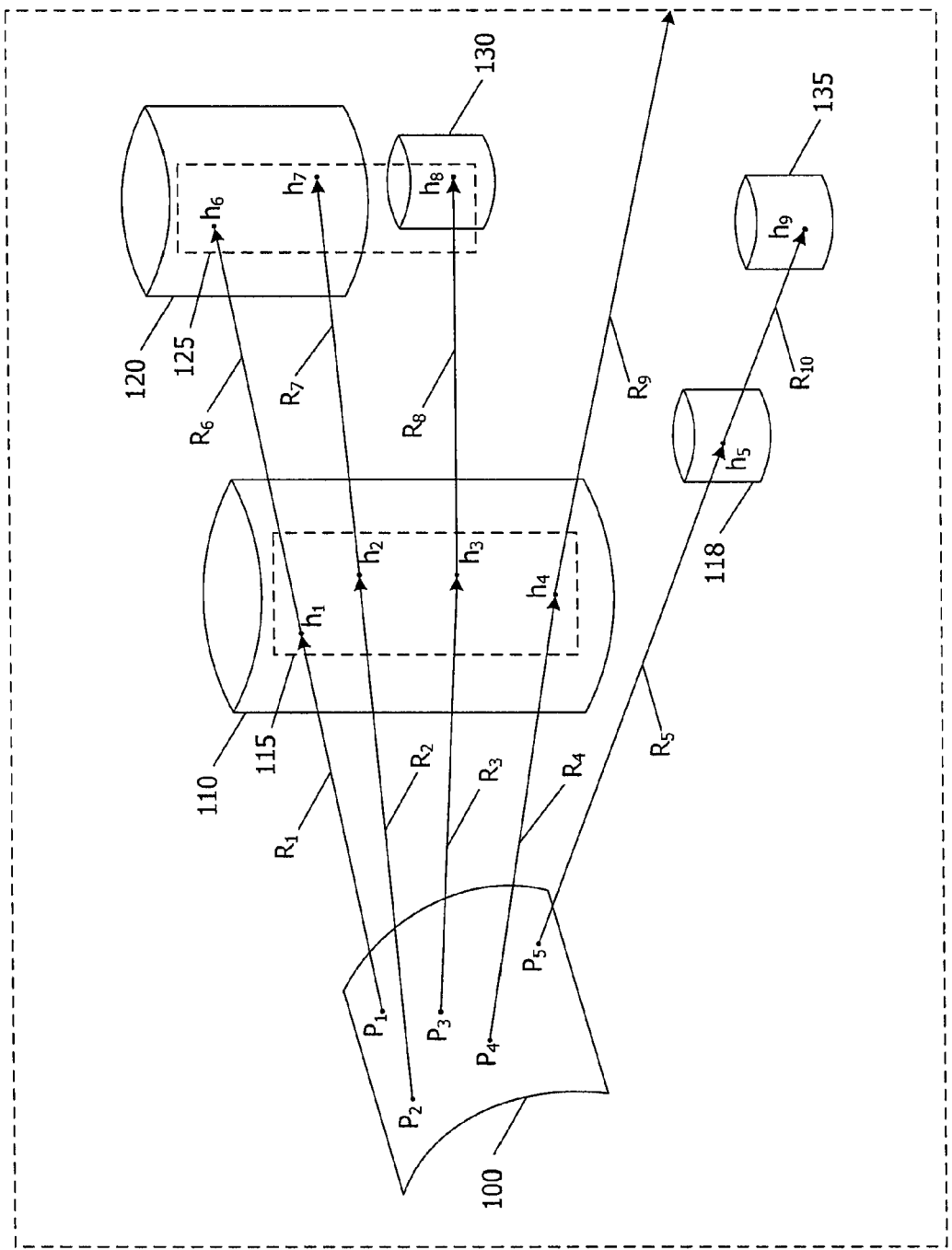
FIG. 1 is a scene that illustrates a system for coalescing shading hit points in a ray tracing system for computer graphics.

FIG. 1 is a scene that illustrates a system for coalescing shading hit points in a ray tracing system for computer graphics. The scene may be a still image or may be included in an animation graphic. The scene includes objects to be rendered. Each object in the scene is associated with a list of attributes. One attribute identifies a shader program or a group of shader programs associated with the object. In one embodiment, different points on one or more objects may be associated with the same shader program. In another embodiment, at least two points on the object may be associated with different shader programs.

An object to be shaded in a scene may be divided into a number of subobjects, such as subobject 100. The shading on subobject 100 may be estimated by performing shading computations at a number of shading points ($P_1$, $P_2$, $P_3$, $P_4$, $P_5$). The shading points $P_1$-$P_5$ together comprise a shading grid. A typical shading grid may include hundreds or thousands of shading points. However, to simplify description of the invention, the shading grid of the subobject 100 includes only five shading points. In some embodiments, an object to be shaded is not divided into subobjects such that the shading points do not comprise a shading grid. Rather, all of the shading points are a part of the original object and the entire object is shaded as a whole.

Each shading point is associated with a direction such that when trace( ) is called, rays ($R_1$, $R_2$, $R_3$, $R^4$, $R_5$) are extended from the subobject 100 at the shading points $P_1$-$P_5$ in the corresponding direction. As one having ordinary skill in the art would appreciate, the rays $R_1$-$R_5$ may be launched by other ray tracing functions in the renderer, such as the gather( ), environment( ), or occlusion( ), operators. The rays $R_1$-$R_5$ may be launched simultaneously using a SIMD operation. However, as one having ordinary skill in the art would appreciate, each ray may also be launched separately in an inner loop of the shading program trace( ) operators such that the rays $R_1$-$R_5$ are launched serially. After the rays are launched, execution of the shader program may be suspended. Execution of the shader program resumes after the rays and the shading points are evaluated in accordance with embodiments of the invention as described below.

A ray data structure is constructed for each original ray launch point (i.e., shading point) to determine if and where the ray intersects another object in the scene. Some of the rays, such as $R_1$-$R_4$, may intersect an object 110 in the scene at hit points (e.g., $h_1$, $h_2$, $h_3$, $h_4$). Other rays may intersect other objects or may not intersect any objects in the scene. For example, ray $R_5$ intersects a different object (i.e., object 118).

Unlike the conventional ray tracing approach, ray tree computations are not immediately pursued deeper for each hit point. The location of each hit point $h_1$-$h_5$ is identified after the first rays $R_1$-$R_5$ are launched from the subobject 100.

Other pertinent information is collected about the hit points $h_1$-$h_5$ such as which shader program should be executed to evaluate the hit point. A sorting algorithm analyzes the hit points $h_1$-$h_5$ and assigns the hit points $h_1$-$h_5$ to a group according to which hit points can be shaded together. For example, hit points associated with the same shader program may be shaded together. In one embodiment, the hit points are grouped according to attributes associated with the intersected objects (e.g. transformation state, active lights, etc).

A shader program is executed for one group of hit points to evaluate all of the hit points in the group. A shader program can process one group of hit points in a single pass. Therefore, a single execution of a shader program computes output results for every hit point in the group. The output for each hit point can be unique to that point, based on geometric properties and other attributes associated with each point. In some embodiments, when several separate groups of hit points are available for shading, the associated shader programs can be executed in parallel, thereby shading two or more groups of points simultaneously. This holds true even if only one hit point is evaluated by each shader program.

As shown in FIG. 1, hit points $h_1$-$h_4$ are grouped in a shading grid 115 because they may be shaded together (i.e., hit points $h_1$-$h_4$ are associated with the same shader program). For example, the surface properties of object 110 may be represented by a shader program, and evaluating the object 110 at hit points $h_1$-$h_4$ may result in colors which are similar or which vary according to the particular hit locations, due to shadow edges, surface grain, etc. However, hit point $h_5$ is not included in the shading grid 115 with hit points $h_1$-$h_4$ because hit point $h_5$ is associated with a different shader program (e.g. the surface at hit point $h_5$ corresponds to a different set of material properties.) As one having ordinary skill in the art would recognize, the hit points that are grouped into the same shading grid are not necessarily associated with the same object because hit points on different objects in a scene may be associated with the same shader program and input attributes.

The hit points $h_1$-$h_4$ in the shading grid 115 are input into the corresponding shader program for evaluation. When the shader program is executed, output values are calculated at each hit point $h_1$-$h_4$ using the corresponding input values. In some embodiments, some hit points may be associated with more than one shader program such that the value at that hit point is computed by executing more than one shader. Generating values for a group of hit points $h_1$-$h_4$ returns the same results as if the shader program(s) were executed individually at each point. In some embodiments, some hit points cannot be grouped with other hit points because there is not a commonly shared shader program or other required attribute. In this case, the hit point is individually evaluated in the conventional manner.

The shader output values at the hit points are returned to the shader program that originally called trace( ) (i.e., the shader program associated with the shading points $P_1$-$P_5$ on the subobject 100). Each ray is provided with the evaluation of the corresponding hit point. The shader program that originally called trace( ) generates its own output values at each input grid point (i.e., one output value for each shading point $P_1$-$P_5$). The output values may then be used to render an image of the scene that includes the subobject 100. Alternatively, the output values may be used to generate an intermediate data structure that is configured for further processing.

In a ray tree, a shader program calls trace( ) launches a ray, and receives a hit point; and then the shader program at the hit point calls trace( ) to launch another ray into the scene from the hit point. The algorithm described above is reapplied such that new rays are launched from the hit points with input values generated from the previous trace( ) call. As shown in FIG. 1, the shader program associated with object 110 calls trace( ) and four rays ($R_6$, $R_7$, $R_8$, $R_9$) are launched from hit points $h_1$-$h_4$ to identify new hit points for those rays. Some rays may intersect another object in the scene. For example, rays $R_6$ and $R_7$ intersect object 120 at hit points $h_6$, $h_7$, and ray $R_8$ intersects object 130 at hit point $h_8$. Other rays (e.g., ray $R_9$) may not intersect any objects in the scene. In one embodiment, other rays may be launched in a parallel thread from hit points associated with a different object or shading grid. For example, ray $R_{10}$ may be launched from the object 118 at hit point $h_5$ and may intersect object 135 at hit point $h_9$.

As described above in relation to object 110, the hit points associated with the same shader program are grouped together using a sorting algorithm. For example, hit points $h_6$-$h_8$ are grouped together as shading grid 125 because they are associated with the same shader program. Values are then calculated for each hit point in the shading grid 125. The values are then returned as the results corresponding to rays $R_6$-$R_8$. Similarly, the value for $h_9$ is calculated and returned for ray $R_{10}$. Additional shading computations are performed based on the returned values and those results are returned to the original shader program that launched the rays from subobject 100.

Additional rays may be launched from hit points $h_6$-$h_8$, and shading values can be calculated and returned to a ray tracing algorithm from the new hit points. This process can be repeated until the ray tree is fully evaluated. Thus, the image may be rendered with accurately shaded objects using the values from the evaluated ray tree.

As described above, each shading grid is a computational array of hit points which is evaluated by a corresponding shader program as one item. Each ray tracing call may utilize a previously generated shading grid to perform computations and generate a new shading grid. The new shading grid may then be used to perform subsequent computations for a different ray tracing call.

Eventually, ray tracing due to an original grid will stop (e.g., because no additional hits are found, or the hit objects do not cast more rays). In one embodiment, a limit may be established for how many generations of rays are launched due to a given shading point. Once the limit is reached, the ray tree is considered to be fully evaluated.

Figure 2:
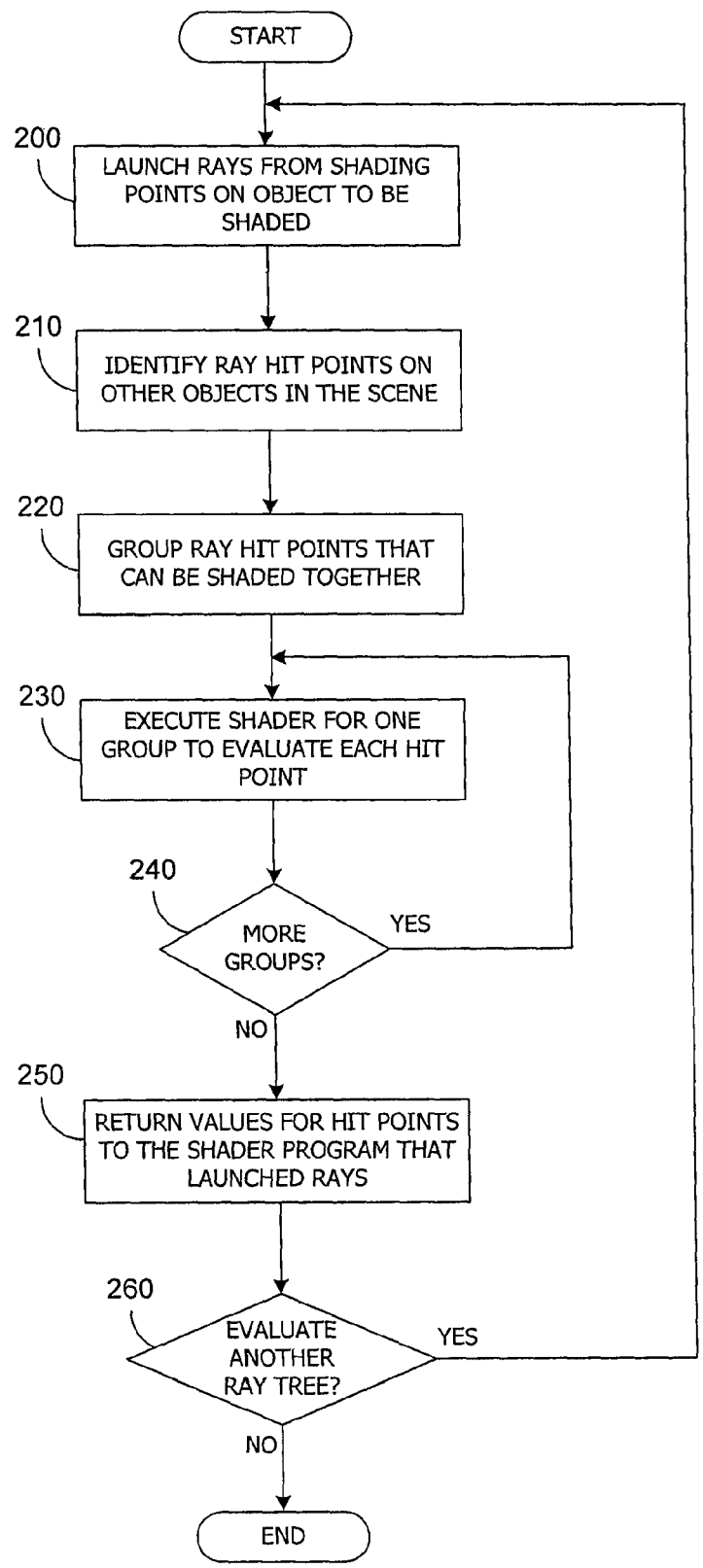
FIG. 2 is a flow diagram illustrating a method for coalescing shading hit points in a ray tracing system for computer graphics.

FIG. 2 is a flow diagram illustrating a method for coalescing shading hit points in a ray tracing system for computer graphics. In some embodiments, an object to be shaded in a scene is divided into a number of subobjects. Each subobject includes a group of shading points to be shaded together. The group of shading points may comprise a shading grid. In some embodiments, the shading points of the entire object are shaded together without dividing the object into subobjects.

A shader program calls a ray tracing function and rays are launched from the shading points on the object to be shaded (step 200). The rays extend from the shading points into the scene in a direction associated with each shading point. The rays may intersect other objects in the scene or may not intersect anything. The rays may be launched simultaneously using a SIMD operation or the rays may be serially launched. After the rays are launched, execution of the launching shader program may be suspended until the shading points are evaluated.

Hit points are identified on other objects in the scene at the location where the rays intersect the other objects (step 210). Some rays may not intersect any objects so that there is no hit point to be identified for the ray. Each object is associated with at least one shader program that computes shading values for a given hit point. In some embodiments, two or more objects may be associated with the same shader program.

The hit points that can be shaded together are assigned to the same group (step 220). A sorting algorithm is used to identify which hit points can be shaded together. In some embodiments, the hit points that are associated with the same shader program are grouped together in a shading grid. In some embodiments, additional restrictions on combining may be enforced; only the hit points from objects with conforming attributes (e.g., attribute or mode values which do not cause contradictory rendering behavior within a single grid) are grouped together in a shading grid.

A shader program is executed for one group of hit points to evaluate all of the hit points in the group (step 230). The shader program processes the group of hit points in a single pass. Therefore, a single execution of the shader program computes output results for every hit point in the group. In some embodiments, when several separate groups of hit points are available for shading, their associated shader programs can be executed in parallel, thereby shading two or more groups of points simultaneously. A shader program invoked at step 230 may itself call a ray tracing function, which would recursively begin an evaluation, starting with step 200, of a ray subtree rooted at the shading grid made up of the current group of hit points. If no new ray tracing functions are called, or if no new rays find intersections, then ray processing terminates at these leaves of the ray tree. Step 230 is complete when all shading has completed for the current grid, including recursive subtrees.

A determination is made whether there are remaining groups of hit points to be evaluated by their associated shader programs (step 240). The sorting operation on the initial set of hit points may have created several distinct shading groups. If there are more groups of hit points to be evaluated, processing returns to step 230. If there are no other groups of hit points to be evaluated, processing continues to step 250.

The results of evaluating shaders at hit points are returned to the shader program that originally launched the rays (step 250). Each ray is provided with the values calculated at the corresponding hit point. The calculated values are used to shade the grid points from which the rays were launched. Thus, an image may be rendered that includes at least the object from which the rays were originally launched. Alternatively, the calculated values may be used to generate an intermediate data structure that is configured for further processing.

A determination is made whether another ray tree is to be evaluated (step 260). A new ray tree may be started when the current shader program calls a ray tracing function as another step in its shading algorithm. If another ray tree is to be evaluated, processing returns to step 200. Otherwise, processing terminates.

Figure 3:
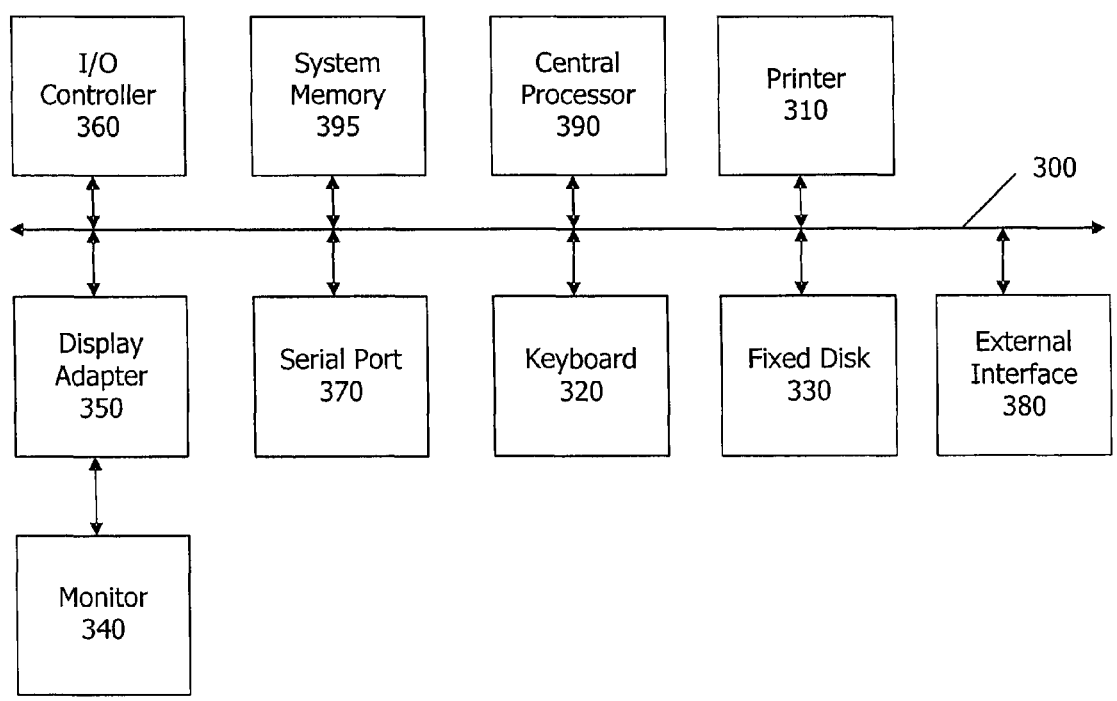
FIG. 3 shows an exemplary block diagram of some elements that may be present in a computer device configured to execute a shading program that utilizes ray hit coalescing according to embodiments of the invention.

FIG. 3 shows an exemplary block diagram of some elements that may be present in a computer device configured to execute a shading program that utilizes ray hit coalescing according to an embodiment of the invention. The subsystems shown in FIG. 3 are interconnected via a system bus 300. Additional subsystems such as a printer 310, a keyboard 320, a fixed disk 330, a monitor 340, which is coupled to a display adapter 350, and others are shown. Peripherals and input/output (I/O) devices, which couple to an I/O controller 360, can be connected to the computer system by any number of means known in the art, such as a serial port 370. For example, the serial port 370 or an external interface 380 can be used to connect the computer apparatus to a wide area network such as the Internet, a mouse input device, or a scanner. The interconnection via the system bus 300 allows a central processor 390 to communicate with each subsystem and to control the execution of instructions from a system memory 395 or the fixed disk 330, as well as the exchange of information between subsystems. The system memory 395 and/or the fixed disk 330 may embody a computer readable medium.

As is apparent from the above description, a method for evaluating ray trees in accordance with the present invention improves the performance of a ray tracing system by arranging ray hit points that can be shaded together as a group in the same shading grid. A shading program operates on a group of ray hit points in a single pass by executing each program operator on computational grid built from the group of hit points, rather than executing the entire shading program at each hit point individually.

The present invention has been described in terms of specific embodiments. As will be understood by those skilled in the art, the embodiments illustrated above may be modified, altered, and changed without departing from the scope of the present invention. The scope of the present invention is defined by the appended claims.

What is claimed is:

1. A computer-implemented method for rendering images of objects in computer-generated scenes, the method comprising:
   receiving, at one or more computer systems, information identifying a location for each ray in a first plurality of rays at which the ray intersects with an object of a computer-generated scene;
   sorting, with one or more processors associated with the one or more computer systems, the location for each ray in the first plurality of rays into at least one group in a set of one or more groups before pursuing deeper in the computer-generated scene from the location of at least one ray in the first plurality of rays based on whether the location for the ray can be shaded together with another location for another ray at which the another ray intersects an object of the computer-generated scene;
   generating, with the one or more processors associated with the one or more computer systems, information configured for rendering an image of the computer-generated scene for a shader program associated with a first group in the one or more groups; and
   storing the information for the shader program associated with the first group in the one or more groups in a storage device associated with the one or more computer systems.

2. The method of claim 1, wherein generating, with the one or more processors associated with the one or more computer systems, the information for the shader program associated with the first group in the one or more groups comprises generating a shading grid associated with the first group.

3. The method of claim 1, further comprising:
   receiving, at the one or more computer systems, information identifying a location for each ray in a second plurality of rays at which the ray intersects with an object of the computer-generated scene; and
   sorting, with the one or more processors associated with the one or more computer systems, the location for each ray in the second plurality of rays into at least one group in the set of one or more groups before pursuing deeper in the computer-generated scene from the location of at least one ray in the second plurality of rays based on whether the location for the ray can be shaded together with another location for another ray at which the another ray intersects an object of the computer-generated scene.

4. The method of claim 1, further comprising generating, with the one or more processors associated with the one or more computer systems, information for a shader program associated with a second group in the one or more groups.

5. The method of claim 4, wherein generating, with the one or more processors associated with the one or more computer systems, the information for the shader program associated with the second group in the one or more groups comprises generating a shading grid associated with the second group based on the information for the shader program associated with the first group in the one or more groups.

6. The method of claim 1, wherein generating, with the one or more processors associated with the one or more computer systems, the information for the shader program associated with the first group in the one or more groups further comprises applying an operator of the shading program associated with the first group.

7. The method of claim 1, wherein receiving, at the one or more computer systems, the information identifying the location for each ray in the first plurality of rays comprises receiving the information identifying the location for each ray in the first plurality of rays from shading points on an object to be shaded.

8. The method of claim 7, wherein the shading points comprise a computational array of values that are evaluated together.

9. The method of claim 1, further comprising:
determining, with the one or more processors associated with the one or more computer systems, whether the location for at least one ray in the first plurality of rays can be shaded together with another location for another ray at which the another ray intersects an object of the computer-generated scene in response to querying at least one object of the computer-generated scene for a shader program associated with a predetermined location of the at least one object.

10. The method of claim 1, wherein a plurality of the locations for rays in the first plurality of rays sorted into at least one group in the one or more groups are associated with the same object of the computer-generated scene having the same shader program at the plurality of the locations.

11. The method of claim 1, wherein at least two of the locations for rays in the first plurality of rays sorted into at least one group in the plurality of groups are associated with different objects having the same shader program at the at least two of the locations.

12. A non-transitory computer-readable medium storing computer-executable code for rendering of images of objects in computer-generated scenes, the non-transitory computer-readable medium comprising:
code for receiving information identifying a location for each ray in a first plurality of rays at which the ray intersects with an object in a first set of objects in a computer-generated scene;
code for sorting the location for each ray in the first plurality of rays into at least one group in a set of one or more groups before pursuing deeper in the computer-generated scene from the location of at least one ray in the first plurality of rays based on whether the location for the ray can be shaded together with another location for another ray at which the another ray intersects an object of the computer-generated scene; and
code for generating information configured for rendering an image of the computer-generated scene for a shader program associated with a first group in the one or more groups.

13. The non-transitory computer-readable medium of claim 12, wherein the code for generating the information for the shader program associated with the first group in the one or more groups comprises code for generating a shading grid associated with the first group.

14. The non-transitory computer-readable medium of claim 12, further comprising:
code for receiving information identifying a location for each ray in a second plurality of rays at which the ray intersects with an object of the computer-generated scene; and
code for sorting the location for each ray in the second plurality of rays into at least one group in the set of one or more groups before pursuing deeper in the computer-generated scene from the location of at least one ray in the second plurality of rays based on whether the location for the ray can be shaded together with another location for another ray at which the another ray intersects an object of the computer-generated scene.

15. The non-transitory computer-readable medium of claim 12, further comprising code for generating information for a shader program associated with a second group in the one or more groups.

16. The non-transitory computer-readable medium of claim 15, wherein the code generating the information for the shader program associated with the second group in the one or more groups comprises code for generating a shading grid associated with the second group based on the information for the shader program associated with the first group in the one or more groups.

17. The non-transitory computer-readable medium of claim 12, wherein the code for generating the information for the shader program associated with the first group in the one or more groups further comprises code for applying an operator of the shading program associated with the first group.

18. The non-transitory computer-readable medium of claim 12, wherein the code for receiving the information identifying the location for each ray in the first plurality of rays comprises code for receiving the information identifying the location for each ray in the first plurality of rays from shading points on an object to be shaded.

19. The non-transitory computer-readable medium of claim 18, wherein the shading points comprise a computational array of values that are evaluated together.

20. The non-transitory computer-readable medium of claim 12, further comprising:
code for determining whether the location for at least one ray in the first plurality of rays can be shaded together with another location for another ray at which the another ray intersects an object of the computer-generated scene in response to querying at least one object of the computer-generated scene for a shader program associated with a predetermined location of the at least one object.

21. The non-transitory computer-readable medium of claim 12, wherein a plurality of the locations for rays in the first plurality of rays sorted into at least one group in the one or more groups are associated with the same object of the computer-generated scene having the same shader program at the plurality of the locations.

22. The non-transitory computer-readable medium of claim 12, wherein at least two of the locations for rays in the first plurality of rays sorted into at least one group in the plurality of groups are associated with different objects having the same shader program at the at least two of the locations.

* * * * *